United States Patent [19]

Krishnan et al.

[11] Patent Number: 4,772,655

[45] Date of Patent: Sep. 20, 1988

[54] PIGMENTED, FLAME RESISTANT POLYCARBONATE COMPOSITIONS

[75] Inventors: Sivaram Krishnan; Roger J. White, both of Pittsburgh, Pa.; Ronald L. Price, Moundsville, W. Va.

[73] Assignee: Mobay Corporation, Pittsubrgh, Pa.

[21] Appl. No.: 56,577

[22] Filed: Jun. 1, 1987

Related U.S. Application Data

[63] Continuation-in-part of Ser. No. 776,559, Sep. 16, 1985, abandoned.

[51] Int. Cl.$^4$ ............................ C08K 3/36; C08K 3/10
[52] U.S. Cl. ..................................... 524/437; 524/493; 524/508; 524/611
[58] Field of Search ................ 524/508, 437, 493, 611

[56] References Cited

U.S. PATENT DOCUMENTS

| | | | |
|---|---|---|---|
| 3,360,498 | 12/1967 | Rawlings | 260/15.7 |
| 3,933,730 | 1/1976 | Hoogeboom | 260/37 |
| 4,049,614 | 9/1977 | Baron et al. | 260/37 |
| 4,223,100 | 9/1980 | Reinert | 524/404 |
| 4,563,496 | 1/1986 | Lindner et al. | 524/437 |
| 4,647,602 | 3/1987 | Wilczak et al. | 523/204 |
| 4,649,168 | 3/1987 | Kress et al. | 524/508 |

*Primary Examiner*—Lewis T. Jacobs
*Attorney, Agent, or Firm*—Gene Harsh; Joseph C. Gil; Aron Preis

[57] ABSTRACT

The present invention is directed to flame retardant, pigmented polycarbonate molding compositions which properties include both good flame resistance properties and virtual freedom from streaking. The compositions are particularly suitable for use in molding machines using hot runner tools. The composition of the invention comprise a thermoplastic aromatic polycarbonate resin, a flame retarding agent, pigments, polytetrafluoroethylene—ASTM Type 3—and an amount of finely divided hydrophobic silicon dioxide sufficient for providing streaking-free molded articles.

10 Claims, No Drawings

PIGMENTED, FLAME RESISTANT POLYCARBONATE COMPOSITIONS

CROSS-REFERENCE TO RELATED APPLICATION

The present application is a continuation-in-part of U.S. application Ser. No. 776,559 filed Sept. 16, 1985, now abandoned.

FIELD OF THE INVENTION

The invention concerns polycarbonate molding compositions and articles molded therefrom. More particularly, the compositions are pigmented and flame resistant.

BACKGROUND OF THE INVENTION

Streaking is a term of art used to describe a particular surface cosmetic defect in a molded part. It is believed that this defect which appears as striations in molded pigmented resins results from poor dispersion of the pigment. Moldings prepared from flame retardant, pigmented polycarbonates were noticed to exhibit a particularly objectionable degree of streaking if PTFE was used as a drip suppressant in the composition. As is described below, the art sought the means to alleviate the defect yet no solutions proposed hitherto were completely satisfactory.

U.S. Pat. No. 4,049,614 discloses polycarbonate molded articles containing pigments where silica was used to improve the surface appearance, i.e., to provide color homogeneity throughout the surface. U.S. Pat. No. 3,360,498 discloses polycarbonate compositions containing silica powder having a treated surface. The compositions are said to exhibit an improved level of hydrolytic and thermal stability as well as abrasive and solvent resistance. Thermally stable translucent polycarbonate compositions containing a mixture of poly(-dimethylsiloxane) gum and finally divided silica have been disclosed in U.S. Pat. No. 3,933,730.

SUMMARY OF THE INVENTION

The present invention is directed to flame retardant, pigmented polycarbonate molding compositions which properties include both good flame resistance properties and virtual freedom from streaking. The compositions are particularly suitable for use in molding machines using hot runner tools. The composition of the invention comprises a thermoplastic aromatic polycarbonate resin, a flame retarding agent, pigments, polytetrafluoroethylene—ASTM Type 3—and an amount of finely divided hydrophobic silicon dioxide sufficient to provide flame retardant streak-free molded articles.

DETAILED DESCRIPTION OF THE INVENTION

The Polycarbonate Resin

The polycarbonate resins useful in the practice of the invention are homopolycarbonates, copolycarbonates and terpolycarbonates or mixtures thereof. The polycarbonates generally have a molecular weight of 10,000–200,000 (weight average molecular weight), preferably 20,000–80,000 and their melt flow rate, per ASTM D-1238 at 300° C., is about 1 to about 24 gm/10 min., preferably about 2–15 gm/10 min. They may be prepared, for example, by the known diphasic interface process from a carbonic acid derivative such as phosgene and dihydroxy compounds by polycondensation (see German Offenlegungsschriften Nos. 2,063,050; 2,063,052; 1,570,703; 2,211,956; 2,211,957 and 2,248,817; French Pat. No. 1,561,518; and the monograph, H. Schnell, "Chemistry and Physics of Polycarbonates", Interscience Publishers, New York, 1964, all incorporated herein by reference).

In the present context, dihydroxy compounds suitable for the preparation of the copolycarbonates of the invention conform to the structural formulae (1) or (2)

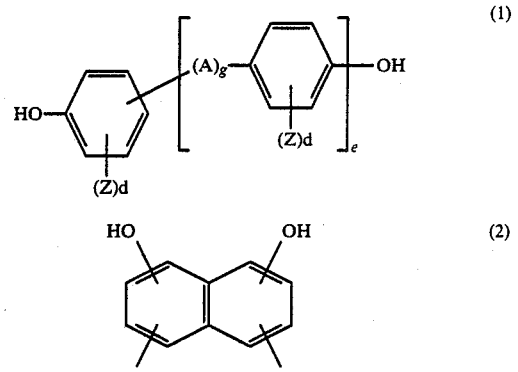

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

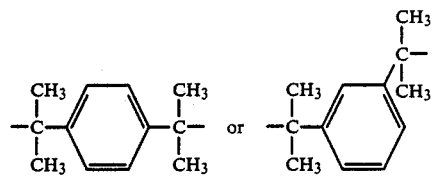

e and g both denote the number 0 to 1;

Z denotes F, Cl, Br or C$_1$–C$_4$-alkyl and if several Z radicals are substituents in one aryl radical, they may be identical or different;

d denotes 0 or an integer of from 1 to 4; and f denotes 0 or an integer of from 1 to 3.

Among the useful bisphenols in the practice of the invention are hydroquinone, resorcinol, bis(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones and α,α'-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2,-bis-(3-chloro-4-hydroxyphenyl)-propane, bis-(3,5-dimethyl-4-hydroxyphenyl)-methane, 2,2,-bis-(3,5-dimethyl-4-hydroxyphenyl)-propane bis- (3,5-dimethyl-4-hydroxyphenyl)-sulfide, bis-3,5-dimethyl-4-hydroxyphenyl)-sulfoxide, bis-(3,5-dimethyl-4-hydroxyphenyl)-sulfone, hydroxybenzophenone, 2,4,-bis-(3,5-dimethyl-4-hydroxyphenyl)-2-methylbutane, 1,1,-bis-(3,5-dimethyl-4-hydroxyphenyl)-cyclohexne, $\alpha,\alpha'$, bis-(3,5-dimethyl-4-hydroxyphenyl)-p-diisopropylbenzene and 4,4'-sulfonyl diphenyl, Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. No. 3,036,036 and 4,210,741, both incorporated by reference herein.

The polycarbonates of the invention may also be branched by condensing therein small quantities, e.g., 0.05–2.0 mol % (based on the quantity of bisphenols used) of polyhydroxyl compounds. Polycarbonates of this type have been described, for example, in German Offenlegunggschriften Nos. 1,570,533; 2,116,974 and 2,113,347; British Pat. Nos. 885,442 and 1,079,821 and U.S. Pat. Nos. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4',4"-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference U.S. Pats. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the tradenames Merlon M-39, Merlon M-40 and Merlon M-50, all of which are bisphenol A based homopolycarbonate resins differing in terms of their respective molecular weights and characterized in that their melt indices per ASTM D-1238 are 12–24, 6–11.9 and 3.0–5.9 gm/10 min., respectively, all available from Mobay Chemical Corporation of Pittsburgh, Pa.

Flame retarding agents in the present context includes salts which are formed upon a reaction between an alkali metal element and an inorganic acid. Lithium, sodium and potassium salts are preferred. Suitable inorganic acids include any compound which does not contain a carbon atom and meets the traditional test of acidity. Among the suitable acids are the mineral acids and other Lewis acids which do not contain carbon atoms. Preferred acids are those that form salts with alkali metals which have pH values of about 7 or less.

The most preferred salts are complex ion metal salts such as alkali metal complex fluoro anion salts, this terminology being derived from the discussion of fluorine compounds contained in the text "Advanced Inorganic Chemistry" by F. A. Cotton and G. Wilkinson, Interscience Publishers, 1962 at pages 290–294, these pages being incorporated herein by reference. Suitable complex ion metal salts include $KBF_4$, $K_3AlF_6$, $KAlF_4$, $K_2SiF_6$, $Na_3AlF_6$, $KPF_6$, $NaSbF_6$, $Na_3FeF_6$, $NaPF_6$, $Na_2SiF_6 Na_2 TiF_6$, $NaBF_4$, $K_2 T_2 F_7$, $K_2 NbF_Y$, $KSb_6$, $K_2 NiF_6$, $K_2 TiF_6$, $LiBF_4$, $LiPF_6$ and $LiBeF_4$.

$KBF_4$, $K_3 ALF_6$, $KAlF_4$, $K_2 SiF_6$ and $Na_3 ALF_6$ are the preferred complex ion metal salts and $Na_3 ALF_6$ -Cryolite-is the most preferred salt.

The compositions of the invention contain an amount of flame retarding agent and PTFE of ASTM-Type 3 which in and of itself is insufficient to render the composition a flammability rating of UL-94, 5V-$\frac{1}{8}$" specimens. Preferably the amount of flame retarding agent is about 0.1 to about 0.4 percent.

Polytetrafluoroethylene (PTFE) is well known in the art and its utility as a drip suppressant in flame retarding formulations of polycarbonate resins has long been recognized. In the context of the present invention, PTFE is used at a level of 0.15 to about 0.3 percent relative to the weight of the polycarbonate resin. The preferred PTFE in the present context is of the type that forms fibrils upon the application of shear, known in the art as ASTM-Type 3.

The pigments used to opacify and color the polycarbonate are those conventionally known to skilled artisans for use in high molecular weight thermoplastic compositions. By far the most preferred pigment used to opacify and whiten mold pigments such as lithopone, zinc sulfide, zinc oxide, antimony trioxide, and the like may be used. To impart color (other than white) to the polycarbonate pigments such as red lead, carbon black, iron black, cuprous oxide, cadmium reds, cinnabar, antimony vermilion (red and brown pigments); zinc yellow, chrome yellows and oranges, cadmium yellow, antimony yellow, (orange and yellow pigments); chrome greens, chrome oxide green (green pigments); cobalt blue, iron blues (blue pigments); lampblacks, vegetable blacks, animal blacks (black pigments) and the like may be used.

In addition to the inorganic pigments reciged above, organic pigments may be used such as pigment chlorine, lithol fast yellow, toluidine red, permanent orange and the like. Dyes may be added to impart color to the polycarbonate such as the phthalocyamines, the anthraquinones and the like.

TiO2 is most frequently used in polycarbonate at a level of about 2 to 8 grams TiO2 per pound of polycarbonate and more preferably 2 to 4 grams per pound of polycarbonate. The above ranges are sufficient to acceptably opacify the polycarbonate article.

The silica used in the practice of the invention is hydrophobic and is characterized in that its incorporation in a polycarbonate resin does not degrade the resin to any significant degree. The silica has an average particle size of up to 10 microns and more preferably between about 1 and 50 nanometrs and its purity is 99.8% or greater (as SiO2) and is preferably produced by the flame hydrolysis of SiCl4. The silica is incorporated into the polycarbonate at an amount sufficient to render the composition a flammability rating of UL-94-5V for specimens ⅛" in thickness preferably at a range of 0.01 to 3 percent by weight and more preferably 0.1 to 0.5% by weight based on the weight of the polycarbonate resin.

In the preparation of the polycarbonates of the invention, the polycarbonate resin in pellet or powdered form, may be mixed in a tumble drum blender with the pigments PTFE and silica. The mixture may be then extrusion blended and subsequently molded to form the final polycarbonate molded article. In place of drum tumbling the pigment, silica and polycarbonate may be mixed by a high speed, high shear blender or other apparatus which provides intimate mixing of the powders.

Many alternative mixing procedures may be utilized for example, a masterbatch having a high concentration of pigment and silica can be made and subsequently let down with more polycarbonate resin. This procedure has the advantage of having a large amount of pigmented polycarbonate concentrate which can be added to polycarbonate resin to form any articles with minimal variation in color.

The invention is further illustrated, but is not intended to be limited by the following examples in which all parts and percentages are by weight unless otherwise specified.

The procedure for testing flame retardant materials is known in the art. The criteria of UL-94 V-O and 5V are described in the publication "Standard for Tests for Flammability of Plastic Materials for Parts in Devices and Appliances" UL-94, Third Edition as revised Sept. 25, 1981, which document is incorporated herein by reference.

Experimental

I. A flame retardant formulation of pigmented polycarbonate—based on a linear, bisphenol A based homopolycarbonate resin—exhibits no streaking upon molding. The addition of 0.15-0.35% of PTFE to this composition, for the purpose of improving the flammability rating resulted in severe streaking.

A most dramatic improvement, the virtual elimination of streaking resulted upon the incorporation in the composition of a small amount, i.e., 0.25%, of silica. The molded parts—using hot runner tools—were completely streak-free.

It was observed that the improvement in accordance with the invention is effective even in hot runner systems which systems are known to be more prone to cause streaking than do sprue gate systems. The hot runner systems are known in the art—see for instance "Advances in the Construction of Hot-Runner Systems" by H.M. Wolff. Grube Messel/Darunstadt, Kunststoff 74 (1984) 12 pp. 710-713. Essentially a hot runner system differs from a conventional sprue gate system in that the heat distribution within the mold is independent of the injection molding machine. System heat is provided via cartridge heaters within the manifold block or torpedo heaters within the melt channels. Temperature controllers control the temperatures of the various zones throughout the hot runner system. Generally, temperatures in a hot runner system are as high or higher than in the injection barrel. In carrying out the Examples in the course of this work, a 13" disc hot runner system comprising one temperature zone for the main manifold and two temperature zones for the gate drops, one zone for each drop was used. Heating was by torpedo type heaters within the manifold channel. The melt temperature was about 650° F.

The compositions in accordance with the invention appear additionally to exhibit an improved level of flame retardance. One formulation containing 0.3% PTFE and 0.25% silica yielded streak-free parts which when tested under UL-94 5V conditions went through more than 6 cycles of burning before dripping occurred (80% went through 9 cycles). By comparison a similar formulation having no silica produced streaked parts which survived only 6 cycles of burning before dripping occurred.

The compositions were compounded in a ZSK twin screw extruder. The extrusion conditions were as follows: production rate 175-200 lbs/min., screw speed 155 rpm, extruder torque 50%, extrusion temperature about 300-330. Vacuum (24 mm Hg) was applied between port zones 4 and 5, during the extrusion. The results are shown in Table 1.

TABLE 1

|  | 1 | 2 | 3 | 4 |
|---|---|---|---|---|
| Melt flow (per ASTM D-1238) gm/10 min. | 11.6 | 11.0 | 10.9 | 10.6 |
| % PTFE | .15 | .20 | .25 | .30 |
| % Cryolite | .37 | .37 | .37 | .37 |
| % Silica | .25 | .25 | .25 | .25 |
| % Mold release | .45 | .45 | .45 | .45 |
| Average Izod impact strength (notched) ⅛", ft.lbs./in. | 11.7 | 7.4 | 7.8 | 2.8 |
| Tensile strength (MPa) | | | | |
| Yield | 63.9 | 63.1 | 64.0 | 64.2 |
| Ultimate | 57.2 | 57.3 | 58.0 | 58.7 |
| Flexural initial modulus (MPa) | 2147 | 2293 | 2243 | 2213 |
| Ultimate flexural strength | 86.3 | 87.5 | 87.3 | 87.2 |
| Dart drop impact (in. lbs.) | 461.8 | 491.3 | 449.6 | 436.5 |
| Heat distortion temperature at 264 psi, °C. | 136.7 | 135.3 | 137.6 | 134.9 |
| UL-94 Flame test 1/16", V-0 | pass | pass | pass | pass |
| Average burn time (sec.) | (1.5) | (1.0) | (0.9) | (0.6) |
| UL-94 Flame test ⅛", 5V | pass | pass | pass | pass |
| % Burns passing | | | | |
| 5 cycles | 20 |  | 20 |  |
| 6 cycles | 40 | 60 | 20 | 20 |
| 7 cycles | 40 | 20 | 40 |  |
| 8 cycles |  |  | 20 |  |
| 9 cycles |  | 20 |  | 80 |

II. In the series of Experiments which are described below, there was evaluated the effect of silica additions on the flame retardant, pigmented polycarbonate compositions. The mechanical and burning properties were determined on samples which were molded on a sprue gate system; the appearance, i.e., the streaking was evaluated by inspection of parts which were molded using a hot runner system. Extrusion blending on a ZSK was carried out as was described above. The compositions contained in addition to polycarbonate, 0.30% of PTFE (ASTM Type 3) powder, 0.37% cryolite and 0.45% of a mold release agent, the latter having no criticality in the present context. In addition, the compositions contained the indicated pigmenting agent and hydrophobic silica where noted. The results of the testing and evaluations are presented in Table 2.

TABLE 2

| | Flame Retardant Grey Formulations | | | | | |
|---|---|---|---|---|---|---|
| | 1 | 2 | 3 | 4 | 5 | 6 |
| Pigment | $TiO_2$[1] | $TiO_2$[1] | $Fe_3O_4$[2] | $Fe_3O_4$[2] | $Fe_3O_4$[2] | Carbon black[3] |
| Silica | — | 0.25 | — | 0.25 | 0.50 | 0.25 |
| Appearance | Poor | Good | Fair | Good | Good | Good |
| Melt Index, gms/10 min | 14.97 | | 14.0 | 14.45 | 14.4 | 13.55 |
| Relative Viscosity | 1.267 | 1.267 | 1.265 | 1.269 | 1.269 | 1.270 |
| Notched Izod Impact, ⅛" ft. lbs/in | 2.09 | 2.68 | 1.78 | 1.78 | 2.33 | 2.45 |
| Tensile Properties: | | | | | | |
| Yield MPa | 64.05 | 64.22 | 64.05 | 64.18 | 64.46 | 63.93 |
| Ultimate Yield, MPa | 54.80 | 55.81 | 52.05 | 53.87 | 52.73 | 56.29 |
| % Elongation | 5 | 6 | 5 | 6 | 6 | 5 |
| % Ultimate Elongation Range | 70–93 | 65–100 | 17–95 | 70–92 | 15–90 | 91–97 |
| Ave. | 85 | 87 | 56 | 84 | 65 | 94 |
| Flammability Tests | | | | | | |
| UL-94 1/16 | V-0 | V-0 | V-0 | V-0 | V-0 | V-0 |
| Average Burn Times | 1.2 | 1.5 | 2.3 | 1.5 | 1.6 | 2.1 |
| UL-94 5V - 0.125" Pass/Fail | Fail | Pass | Fail | Pass | Pass | Pass |
| Average Burn Times (secs) After 5th Cycle | — | 7.0 | — | 6.6 | 9.0 | 5.8 |

[1]About 6.0 gms per lb. of polycarbonate resin
[2]0.25 gms of $Fe_3O_4$ per 1 lb. of polycarbonate resin
[3]0.025 gms of carbon black per 1 lb. of polycarbonate resin III. Further comparisons in accordance with the invention have been carried out demonstrating that the polycarbonate composition which contains PTFE and a flame retarding agent in accordance with the invention does not possess a UL-94 5V rating for ⅛" specimens except upon the addition of silica thereto. While the compositions which contain no silica exhibit a UL-94 V-0 rating for ⅛" specimens they fail the more rigorous demands of the 5V test. The Table below summarizes the comparisons.

| FLAME RETARDANT PROPERTIES OF PIGMENTED POLYCARBONATE COMPOSITIONS | | | | |
|---|---|---|---|---|
| % Polycarbonate resin | 97.79 | 97.54 | 97.82 | 97.57 |
| % Pigment colorants | 1.09 | 1.09 | 1.06 | 1.06 |
| % PTFE | 0.30 | 0.30 | 0.30 | 0.30 |
| % Cryolite | 0.37 | 0.37 | 0.37 | 0.37 |
| % Release Agent | 0.45 | 0.45 | 0.45 | 0.45 |
| % Hydrophobic Silica | — | 0.25 | — | 0.25 |
| Melt Flow Rate gms/10 min. | 12.07 | 12.19 | 12.46 | 12.11 |
| Notched Izod Impact ⅛ inch, ft.lbs/in. | 2.09 | 2.68 | 1.78 | 1.78 |
| Tensile Properties | | | | |
| Yield, MPa | 64.05 | 64.22 | 64.05 | 64.18 |
| Ult. Yield, MPa | 54.80 | 55.81 | 52.05 | 53.87 |
| % Elongation | 5 | 6 | 5 | 6 |
| % Ult. Elongation (Ave) | 85 | 87 | 56 | 84 |
| UL-94 Flame Testing | | | | |
| UL-94 1/16 inch Class | V-0 | V-0 | V-0 | V-0 |
| UL-94 5V ⅛ inch PASS/FAIL | FAIL | PASS | FAIL | PASS |
| Streaking Observed | POOR | GOOD | POOR | GOOD |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) a polycarbonate resin,
   (ii) a pigmenting agent,
   (iii) about 0.1 to 0.4 percent of a complex ion metal salt,
   (iv) about 0.15 to 0.3 percent of ASTM-Type 3 polytetrafluoroethylene and
   (v) finely divided hydrophobic silica in an amount sufficient to render the composition a rating of UL-94 5V (0.125" specimens).

2. The composition of claim 1 wherein said complex ion metal salt is cryolite.

3. The composition of claim 1 wherein said silica is present at an amount of about 0.01 to about 3.0%.

4. The composition of claim 1 wherein said silica has an average particle size of up to 10 microns.

5. The composition of claim 4 wherein said particle size is between about 1 and about 50 nanometers.

6. The composition of claim 1 wherein said silica is present in an amount of 0.1 to about 0.5%

7. In the molding of a pigmented polycarbonate composition which comprises about 0.15 to about 0.3% of polytetrafluoroethylene of ASTM-Type 3 and about 0.1 to about 0.4 % of a complex ion metal salt using a hot runner system the improvement comprising incorporating in said composition a finely divided hydrophobic silica in an amount sufficient to render the composition a flammability rating of UL 94-5V (0.125" specimen).

8. The improvement of claim 7 wherein said complex ion metal salt is cryolite.

9. The improvement of claim 7 wherein said silica has an average particle size of up to 10 microns.

10. The improvement of claim 8 wherein said silica has an average particle size of 1 to 50 nanometers.

* * * * *